No. 786,348. Patented April 4, 1905.

UNITED STATES PATENT OFFICE.

LOUIS A. DREYFUS, OF NEW BRIGHTON, NEW YORK, ASSIGNOR TO THE MURALO COMPANY, OF NEW BRIGHTON, NEW YORK.

PAINT.

SPECIFICATION forming part of Letters Patent No. 786,348, dated April 4, 1905.

Application filed March 3, 1904. Serial No. 196,422.

*To all whom it may concern:*

Be it known that I, LOUIS A. DREYFUS, a citizen of the United States, and a resident of New Brighton, Staten Island, borough and county of Richmond, city and State of New York, have invented a new and useful Paint, of which the following is a full, clear, and exact description.

The product of this invention has the advantageous features of the well-known cold-water paints plus those of an oil-paint—that is to say, it is mixable at the time of application with ordinary cold water—and has the low cost and other advantages of cold-water paints, yet at the same time after application to the wall or other surface to be covered it presents a waterproof surface measurably the same and for some purposes substantially the equivalent of the much more expensive oil-paint. It is adapted to use wherever either of these formerly-known paints are used either for interior or exterior applications. It is practically non-inflammable, practically odorless, and perfectly sanitary.
The essential features of the invention are that I employ as a waterproofing ingredient petroleum or its by-products, as hereinafter stated, which in this composition serves all the purposes of an ordinary paint oil, yet, owing to the peculiar characteristics of petroleum, is essentially different from such oil, because it will not saponify when brought in conjunction with the other ingredients and is likewise substantially non-oxidizable, so that the objectionable features of saponification, which are well known in this art, and likewise those resulting from oxidation are avoided in my composition.

My new preparation may be produced in a substantially dry powdered condition or in paste or liquid form. The powder, while not quite so dry as the well-known cold-water-paint powders, is sufficiently so to be packed and stored in ordinary pasteboard receptacles without injuring them, and if in paste or liquid form, it may be put up in suitable receptacles therefor, in all of which forms it will retain its condition suitable for use for a practically indefinite period.
In producing my invention I proceed as follows: In a mixture containing one hundred parts I take a basic material or pigment, preferably in dry powdered condition, amounting in the aggregate to, say, sixty-five per cent. It may be composed of a single ingredient, such as gypsum, whiting, talc, marble-dust, white-lead, zinc-white, clay, or other material used in the manufacture of paints. I prefer, however, to make up the basic material of a combination of several of these basic materials—as, for example, gypsum, twenty-five per cent.; whiting, twenty-five per cent., and talc, fifteen per cent. To this I add a suitable adhesive or binding material. I prefer to use casein with lime or equivalent alkali—say fifteen per cent. casein and ten per cent. lime or equivalent alkali. Other binding or adhesive materials, among them glue, may, however, be used, in which event, since no lime or alkali will ordinarily be necessary, the proportions of binding material may be twenty-five per cent. To this I add ten per cent. of petroleum product which is non-volatile at ordinary temperatures. I prefer petroleum jelly (frequently called "vaseline") or its equivalent, thus making up the total one hundred parts. The petroleum jelly (vaseline) or equivalent material is added for its waterproofing qualities. Instead of the jelly, however, I may use various other non-volatile forms of petroleum or its by-products—as, for instance, a mixture of high-boiling petroleum-oil, such as the lubricating-oils and paraffin. In fact, various simple or complex petroleum products or mixtures, provided they be non-volatile, may be used. The mass may be colored by the addition of any suitable coloring material in dry powdered form or in liquid form, depending upon the character of the product. These ingredients are placed in a mixer and thoroughly mixed into a homogeneous mass. They are then preferably brushed through a suitable sieve to produce a uniform and fine powdered product. This product, although, as above stated, not absolutely dry, as are some paint products heretofore known, is nevertheless such that it permanently maintains a substantially dry condition, so that it may be indefinitely stored, handled, and used, as the well-known dry-powdered paint compounds now are. I sometimes, however, make up my product in a paste or liquid form, presenting it upon the market in suitable tight packages. I prefer for a purpose hereinafter stated to add a suitable percentage of turpentine, naphtha, or other solvent of petroleum, or other petroleum products. It may be added at the time of manufacture of the product or may be added to the petroleum prior to adding it or just prior to adding the water at the time of use. If the product is to be kept long before use—as for instance, if it is manufactured for export—it is better to add the turpentine, naphtha, or equivalent material at the time of use, because the volatility of these materials is such that they are apt to pass away in the course of time and their beneficial results be lost.

My products are all of them reducible to proper consistency for use by the addition of cold water alone, or, as above stated, the turpentine, naphtha, or like material may be added just before or with the water, and the resulting paint can be applied to the wall or other surface to be covered with a brush or by means of a mechanical painter in the usual manner.

Although I prefer to mix the basic material, the binder, and the petroleum product with or without turpentine, naphtha, or the like all together by suitable mixing apparatus and to pass the product through a sieve all at the same time and in conjunction with one another, nevertheless it is not essential that this method should be carried out. The ingredients may be mixed together in any preferred manner, order, and time. All that is essential under this invention is that the product, whether in a powdered, paste, or liquid form, shall embody at the time of use the ingredients stated. It will also be distinctly understood that the proportions I have given constitute one formula only under which the invention may be practiced. They may vary largely. Indeed, for certain purposes and under certain circumstances it is desirable to vary them. This is well understood in this art and does not require further elaboration. The proportion of petroleum or its products may vary all the way from, say, five per cent. to twenty-five per cent., more or less, and the proportions of the other ingredients also may be varied, as necessity or preference dictates.

Although it is difficult to determine the chemical and physical operation of the ingredients in such a composition as above-described, nevertheless I believe their operation in this case is as follows: By the use of non-volatile protroleum in my new product I escape, as stated, the objectionable features resulting from saponification and oxidation, which are present where other oils or fats are used, whereby my products are permanent. Also, although there is a repellent action between the petroleum particles and the water when the latter is added at the time of use, nevertheless there is such affinity for water possessed by the basic materials and the binder or adhesive material and the percentage of petroleum is such relative to the total mass that the water will readily mix with the mass, reducing it to the condition of a suitable emulsion for application upon the surface to be covered, and its application will be smooth and uniform, having sufficient body and producing a good surface, and during the drying operation I believe that the water contained in the emulsion, carrying with it the basic and adhesive materials, for which it has great affinity, penetrates the surface upon which the paint has been applied, carrying them both fully to the surface, and perhaps the adhesive material slightly penetrates it, so that the basic materials are firmly bound to the said surface and adhere thereon. The petroleum, on the other hand, owing to the repellent action between it and the water, remains upon or is repelled to the outer surface, and this action is accelerated and emphasized if there be present in the mass a percentage of turpentine, naphtha, or other volatile substance, because owing to their volatility they tend to escape as quickly as possible from the surface of the coating and in their passage to it carry the petroleum with them, because the petroleum is repelled by the aqueous material and also because these volatile substances are solvents of the petroleum and the petroleum particles are not solvents of the adhesive material, so that the adhesive material is free to go with the water, as above stated. The resulting wall-covering when dry is therefore, as I have found by demonstration, as follows: Next to the surface of the wall or surface covered there is a layer of the basic material firmly attached to such surface by the adhesive material, and upon the outside of this basic or underlying layer is a thin film or skin composed principally of the petroleum products from which the volatile materials have largely or entirely passed away through evaporation. The result is a smooth handsome well-finished covering having a waterproof or substantially waterproof face, the equivalent, so far as it goes, of an ordinary oil-paint surface, yet greatly reduced in the cost as compared with that of an oil-paint.

It is to be particularly noted that this invention embodies a further discovery which I believe to be entirely new—that is to say, it is well known that petroleum-oil by itself will not adhere to a surface and hold a pigment or basic material there; but I have discovered that when combined with the bases and other materials composing my new paint it will, as I believe, because of the action above stated or because of some other action not known to me during the drying operation form such a bond as I describe above, resulting in a permanent dry waterproof skin or film upon the outside of an underlying layer of basic material. This, so far as I know, is an absolutely new discovery, very valuable in this art.

Having described my invention, I claim—

1. A cold-water paint composed essentially of basic material, binding or adhesive material and a non-volatile petroleum product, for the purpose set forth.

2. A cold-water paint composed essentially of basic material, binding or adhesive material, a non-volatile petroleum product and coloring-matter, for the purpose set forth.

3. A cold-water paint composed essentially of basic material, binding material, a non-volatile petroleum product and a volatile solvent of the petroleum, for the purpose set forth.

4. A cold-water paint composed essentially of basic material, binding material, a non-volatile petroleum product, a volatile solvent of the petroleum and coloring-matter, for the purpose set forth.

5. A cold-water paint composed essentially of basic material, binding or adhesive material and a non-volatile non-saponifiable and non-oxidizing oleaginous material, for the purpose set forth.

6. A cold-water paint composed essentially of basic material, binding or adhesive material and a non-volatile, non-saponifiable and non-oxidizing oleaginous material, which is not a solvent of the adhesive material, for the purpose set forth.

7. A cold-water paint composed essentially of basic material, binding or adhesive material and a non-volatile non-saponifiable oleaginous material, which is not a solvent of the binding or adhesive material, for the purpose set forth.

8. A comminuted paint composition in practically dry form, consisting of a comminuted mineral base, vaseline and a comminuted soluble animal adhesive in substantially the proportions stated.

9. A paint composition in practically dry form, consisting of a comminuted mineral base, vaseline, an adhesive and lime.

In testimony whereof I have signed my name to this specification in the presence of two subscribing witnesses.

LOUIS A. DREYFUS.

Witnesses:
H. W. PEARSON,
J. F. GOULD.